Figure 1:
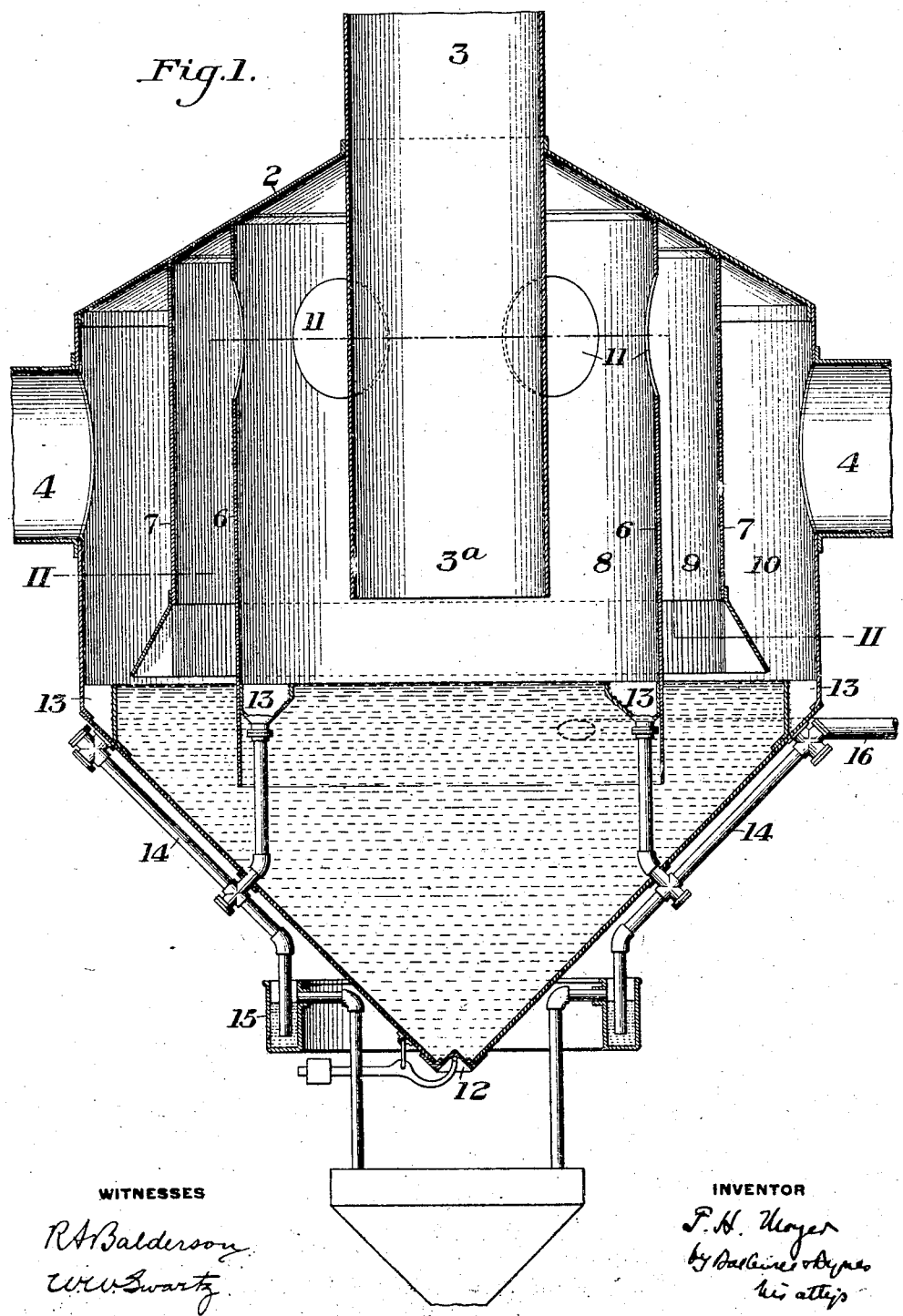

No. 886,009. PATENTED APR. 28, 1908.
F. H. MOYER.
GAS WASHER.
APPLICATION FILED MAR. 1, 1907.

3 SHEETS—SHEET 1.

WITNESSES
R. A. Balderson
W. W. Swartz

INVENTOR
F. H. Moyer
by Balceines & Byrnes
his attys

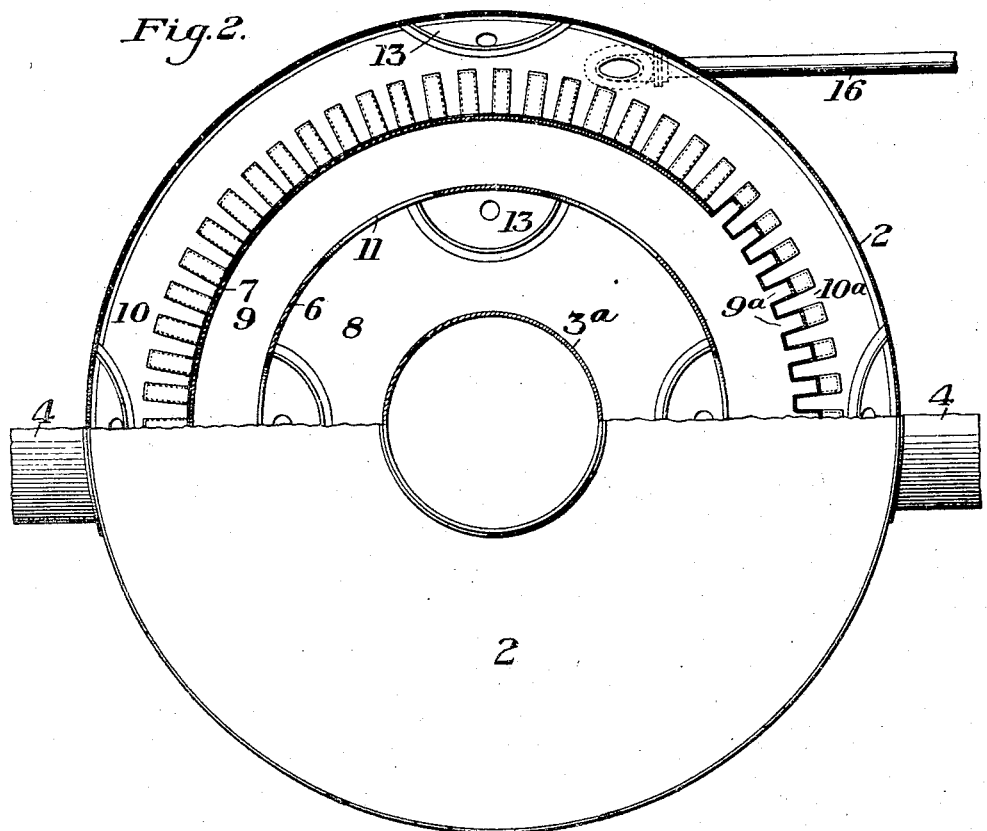
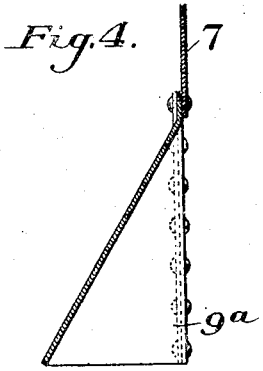
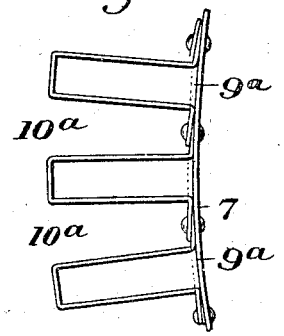

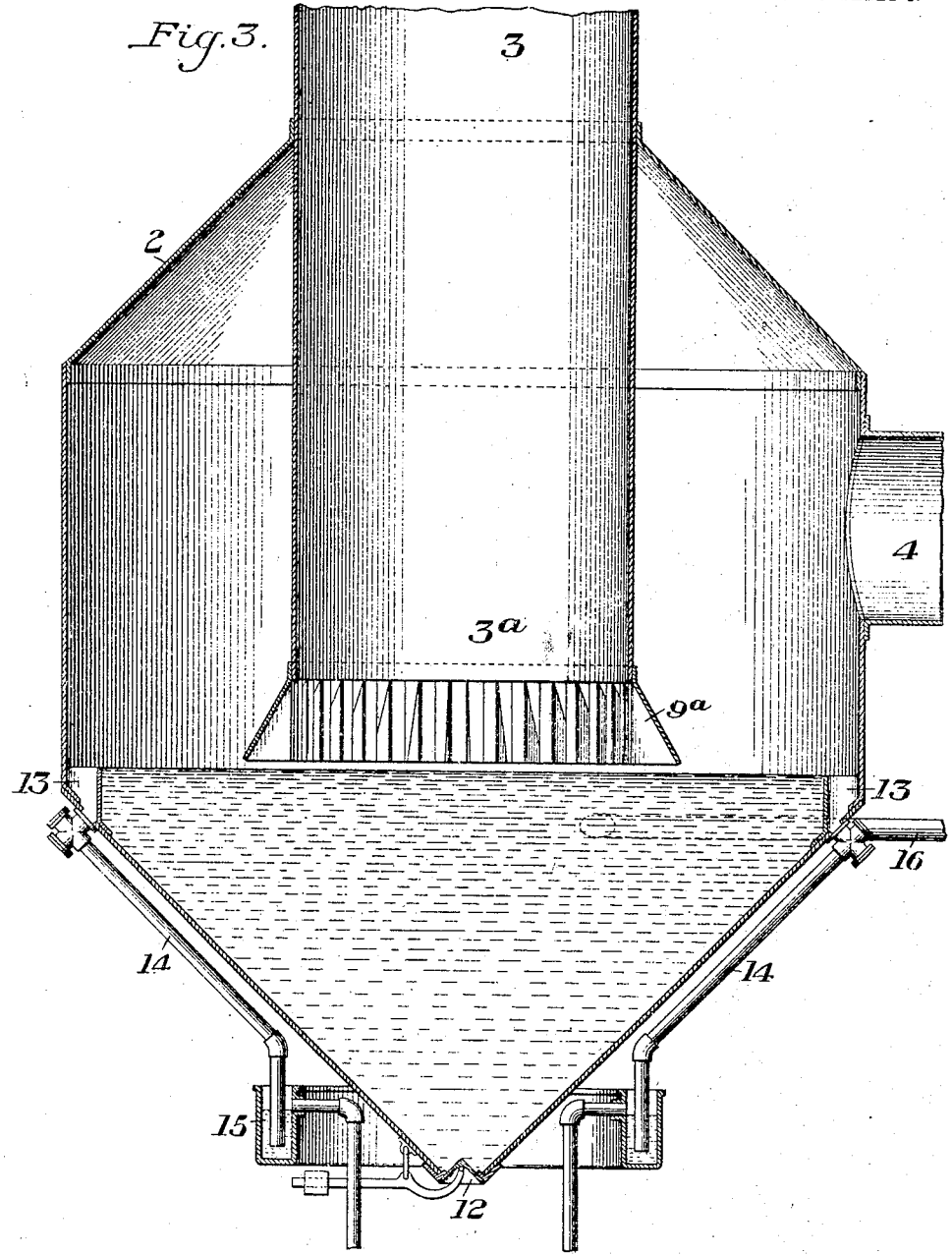

UNITED STATES PATENT OFFICE.

FREDELLIA H. MOYER, OF CLAIRTON, PENNSYLVANIA.

GAS-WASHER.

No. 886,009.	Specification of Letters Patent.	Patented April 28, 1908.

Application filed March 1, 1907. Serial No. 360,029.

*To all whom it may concern:*

Be it known that I, FREDELLIA H. MOYER, of Clairton, Allegheny county, Pennsylvania, have invented a new and useful Improvement in Gas-Washers, of which the following is a full, clear, and exact description, reference being had to the accompanying drawings, forming part of this specification, in which—

Figure 1 is a vertical section of the gas-washer constructed in accordance with my invention; Fig. 2 is a partial horizontal section on the irregular line II—II of Fig. 1; Fig. 3 is a vertical section of a modified form of washer; Figs. 4 and 5 are detail views showing the construction of the corrugated or crimped lower end portion of the partition or baffle in the apparatus.

The invention relates to apparatus used for cleaning blast furnace gases by removing the dust or solid impurities carried in suspension in such gases.

The object of my invention is to provide improved means by which the gases are spread into a flat thin sheet so as to bring the largest possible surface of the gases into contact with the surface of the water contained in the washer, and to provide means whereby any large pieces of coke limestone or similar materials carried into the apparatus by a slip or explosion in the blast-furnace, are deposited in the washer below the surface of the water in the washer and out of the path of the incoming gases.

Another object of my invention is to provide improved means for introducing and removing the water used in the washer by the use of which any foreign matter on the surface of the water is automatically removed and choking or clogging of the passages for the gases is prevented.

It further consists in providing a gas washer which can be used as a dry dust catcher by shutting off the water supply and removing the water in the lower portion of the washer, and in which these operations are all carried out without stopping or retarding the flow of gases through the apparatus.

In the drawings, 2 represents the cylindrical outer shell of the apparatus, and 3 the inlet pipe for the gases. Two outlet pipes 4, 4 are provided, as shown in Fig. 1, although one or more of such outlet pipes may be employed for conducting the cleaned gases from the apparatus. The inlet pipe 3 has an extension $3^a$ which projects downwardly in the shell 2 of the apparatus to within a short distance of the surface of the water. This extension $3^a$ has an open lower end which permits any large pieces of solid materials entering the apparatus through the inlet pipe 3 and extension $3^a$ to settle in the bottom portion of the washer, below the surface of the water in the washer.

In the preferred form of construction shown in Figs. 1 and 2, in addition to the partition formed by the extension $3^a$, are the partitions 6 and 7, these partitions dividing the shell 2 into the compartments or chambers 8, 9 and 10. The partition 6 depends from the top of the shell 2 to a point of such distance below the surface of the water as will prevent the passage of the gases between the end of this partition and the surface of the water. The gases pass from the chamber 8 through the openings 11 located in the upper portion of the partition 6, into the chamber 9. The partition 7 also depends from the top of the shell 2, its lower end terminating at substantially the level of the water overflow, preferably being slightly above this level.

The lower end of the partition 7 is corrugated or fluted, the open sides $9^a$, $10^a$ of the flutes or crimps opening alternately into the chambers 9 and 10. The gases flow from the chamber 9 in a thin annular sheet into the chamber 10 through the annular passage formed by the lower end of the partition 7 and the surface of the water. A cleaning opening is located in the conical lower end portion of the shell 2 through which the dust and other solid materials, collected in cleaning the gases, are removed from the washer. This opening is closed by means of the bell 12, provision being made when necessary, for clamping the bell in its closed position.

Water is supplied to the washer by means of the supply pipe 16, this pipe being located in such manner as will deliver the water tangentially into the washer and cause it to swirl and rotate in the washer, a constant stream of water being supplied to the washer, so as to keep the water in motion. The lower portion of the washer is kept filled with water, which is kept at the desired level by means of the overflow funnels 13, which are secured to the shell 2 and the partition 6 and have water overflow pipes 14. The water pipes 14 lead downwardly and discharge into the water seal 15, which is provided to prevent escape of gases through the pipes.

In the operation of the improved apparatus, the lower portion of the washer is filled with water through the water supply pipe 16. A constant level for the water is maintained by means of the water overflow funnels. The incoming gases on entering the washer through the inlet pipe 3 and extension 3ª are deflected outwardly, by the surface of the water in the washer, into the annular chamber 8 and, rising upwardly in this chamber pass through the openings 11 in the partition 6 into the chamber 9. Contact of the gases with the surface of the water while in the chamber 8 removes a large amount of the dust and finely divided materials carried in suspension in the gases. The open lower end of the inlet pipe extension 3ª permits any large pieces of limestone, coke or other materials that may be thrown into the inlet pipe 3, to be deposited in the bottom of the washer below the level of the water and out of the path of incoming gases.

The gases flow downwardly in the chamber 9, again being deflected by the water, and pass from this chamber into the chamber 10 through the annular passage formed by the crimped or fluted lower end of the partition and the surface of the water, in a thin flat sheet. By crimping or fluting the lower end of this partition a series of radial passages are formed, each passage having an open side, and the open side of alternate flutes or corrugations open into the annular chambers 8 and 9. In this way, the annular sheet of gases is made much thinner than otherwise would be possible, while the area of the opening is still of such size as will not retard the flow of gases through the washer, and the large surface of the gases brought into contact with the water results in the removal of substantially all of the particles of solid materials remaining in suspension in the gases. The gases entering the chamber 10, rise in this chamber and are delivered from the apparatus through the gas outlet pipe 4 on the way to the point of use. Contact of the hot gases with the surface of the water will vaporize some of this water and will absorb some of the vapor. This causes the finer particles of solid materials in the gases to be collected by the vapor and form a scum which will float upon the surface of the water, and, if not removed, this scum will clog and choke the passages for the gases and prevent the successful operation of the washer.

By introducing the water on a tangent to the circumference of the washer, the water is caused to rotate about a vertical axis. The gases in passing over the surface of the water will tend to cause the scum to travel in the direction of flow of the gases and the currents caused by the rotating water in the washer flowing to the water overflow outlets, will rotate the scum on the surface of the water and in this way keep the scum in motion. As the water runs from the washer into the overflow funnels, it carries the scum with it downwardly through the overflow pipes and out of the washer.

In the modification shown in Fig. 3, the fluted or corrugated portion of the apparatus is on the lower open end of the inlet pipe extension 3ª, the overflow pipes and inlet pipes being located as before. The operation is the same as before, the gases impinging on the water but once in this construction.

When it is desired to use the apparatus as a dry dust-catcher, the change may be effected without interruption of the flow of gases by shutting off the supply of water and draining the water from the washer through the cleaning opening located in the bottom of the washer and normally closed by the closing bell.

Modifications in the shape and arrangement of the apparatus may be made without departing from my invention.

I claim:—

1. Apparatus for cleaning gases, comprising a vessel having inlet and outlet openings for the gases, inlet and overflow openings for water, and a depending partition having a fluted lower end, the end of said partition being open and terminating above the level of the water overflow to form an annular opening for the passage of the gases between the end of the partition and the surface of the water; substantially as described.

2. Apparatus for cleaning gases, comprising a vessel having inlet and outlet openings for the gases, inlet and overflow openings for water, and a depending partition having a fluted lower end, the end of said partition being open, said water inlet opening delivering the water tangentially into the apparatus and imparting a rotary motion to the water; substantially as described.

3. Apparatus for cleaning gases, comprising a vessel having inlet and outlet openings for the gases, inlet and overflow openings for water, and a depending partition having a fluted lower end, the end of said partition being open and terminating above the level of the water overflow, so as to form an annular opening having a height of less than one quarter of the diameter of the depending partition and an area greater than the area of said pipe; substantially as described.

4. Apparatus for cleaning gases, comprising a vessel having inlet and outlet openings for the gases, inlet and overflow openings for water, and a depending partition having a fluted lower end, the end of said partition being open and terminating above the level of the water overflow, so as to form an annular opening, having its area at least equal to the area of the depending partition and a vertical width of less than one quarter of the diameter of said pipe; substantially as described.

5. Apparatus for cleaning gases, comprising a vessel having inlet and outlet openings for the gases, inlet and overflow openings for water, a depending extension to the inlet opening for gases, having an open lower end, a depending partition in the vessel extending below the level of the water overflow opening, openings for the gases in the upper portion of said partition, and a second depending partition having a fluted lower end terminating above the level of the water overflow to form an annular opening for the passage of the gases between the end of the partition and the surface of the water; substantially as described.

6. Apparatus for cleaning gases, comprising a vessel having inlet and outlet openings for the gases, inlet and overflow openings for water, and a depending partition through which the entering gases descend, the end of said partition being of irregular contour and terminating above the level of the water overflow, so as to form an opening having a height of less than one quarter of the diameter of the depending partition and an area greater than the area of said pipe; substantially as described.

7. Apparatus for cleaning gases, comprising a vessel having inlet and outlet openings for the gases, inlet and overflow openings for water, and a depending partition, the end of said partition being open of irregular contour and terminating above the level of the water overflow, so as to form an outlet opening, having its area at least equal to the area of the depending pipe and a vertical width of less than one quarter of the diameter of said pipe; substantially as described.

8. Apparatus for washing gases, comprising a vessel having inlet and outlet openings for the gases, an overflow outlet opening for water, said gas inlet and outlet openings being located above the level of the water overflow opening, means for impinging the gases on the surface of the water, and a water-supply inlet positioned to impart rotary motion to the water in the washer to cause movement of foreign materials on the surface of the water; substantially as described.

9. Apparatus for cleaning gases, comprising a vessel having inlet and outlet openings for the gases, inlet and overflow openings for water, and a depending partition having a fluted lower end, the end of said partition being open and terminating above the level of the water overflow to form an annular opening for the passage of the gases between the end of the partition and the surface of the water; substantially as described.

10. An impingement gas washer comprising a vessel arranged to contain water up to a certain level, said vessel having a gas outlet and a depending gas supply channel having a lower end of irregular contour, the end of said channel being open and terminating above the level of the water to form an annular opening of equal area to that of the depending gas supply channel; substantially as described.

11. In a gas washer, a vessel having inlet and overflow liquid openings arranged to maintain the liquid therein at a certain level, an upper outlet for the gases, and a depending gas supply channel having its lower end convoluted in at least a portion thereof; substantially as described.

12. In gas washers, a vessel having means for maintaining a pool of water therein at a certain level, said vessel having a gas outlet and a depending gas supply channel with a lower end of irregular contour in at least a portion thereof, and means for imparting a rotary motion to the water; substantially as described.

13. Apparatus for washing gases, comprising a vessel having a water overflow outlet opening, a gas inlet and a gas outlet opening above the surface of the water, and a tangentially disposed water inlet pipe arranged to create a centrifugal action on the scum to facilitate its conveyance to the overflow outlet; substantially as described.

14. Apparatus for cleaning gases, comprising a vessel having inlet and outlet openings for the gases, an overflow outlet opening for water, a depending partition in the vessel extending below the level of the water outlet opening, an opening for the gases in the upper part of said partition, means for impinging gases on the surface of the water, and water inlet means for creating a centrifugal action on the scum to facilitate its conveyance to the water outlet openings; substantially as described.

15. Apparatus for cleaning gases comprising a vessel having inlet and outlet openings for the gases, inlet and overflow outlet openings for water, a depending partition in said vessel terminating above the level of the water overflow opening, a pool of liquid beneath said vessel and a pipe extending below the level of the water, in said pool, from the water overflow opening in said vessel; substantially as described.

16. Apparatus for cleaning gases comprising a vessel having inlet and outlet openings for the gases, an inlet opening for water, a plurality of overflow outlet openings for the water, a depending partition in said vessel terminating above the level of the water overflow openings, a pool of liquid beneath said vessel and connections extending below the level of the water, in said pool, from the water overflow openings in said vessel; substantially as described.

In testimony whereof, I have hereunto set my hand.

FREDELLIA H. MOYER.

Witnesses:
　WARREN WORTHINGTON,
　E. AWID ERICSSON.